Feb. 28, 1928.
S. B. WINN
1,660,944
TRACTOR TRAILER COMBINATION
Filed Aug. 22, 1924    5 Sheets-Sheet 1
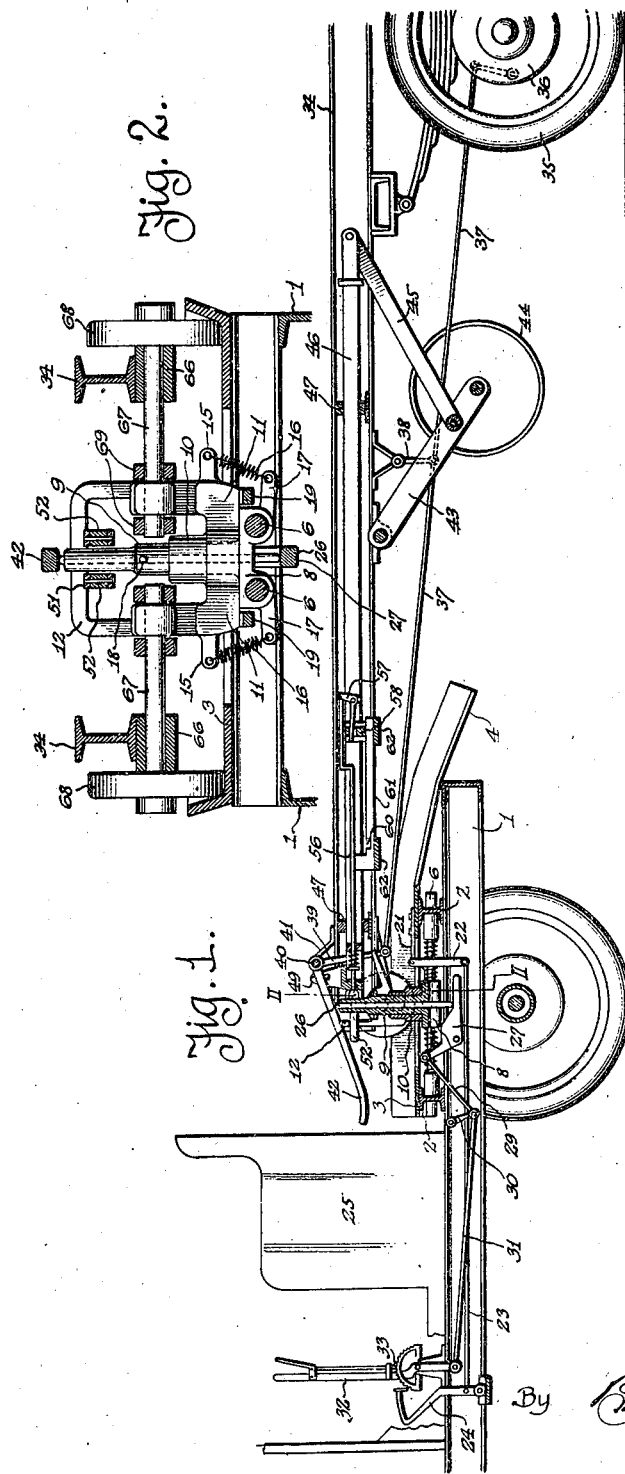
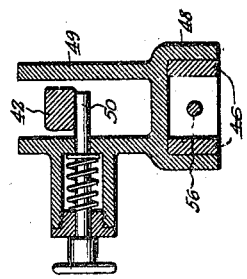
Inventor
Sidney B. Winn.
By
Attorneys Feb. 28, 1928.
S. B. WINN
1,660,944
TRACTOR TRAILER COMBINATION
Filed Aug. 22, 1924   5 Sheets-Sheet 2
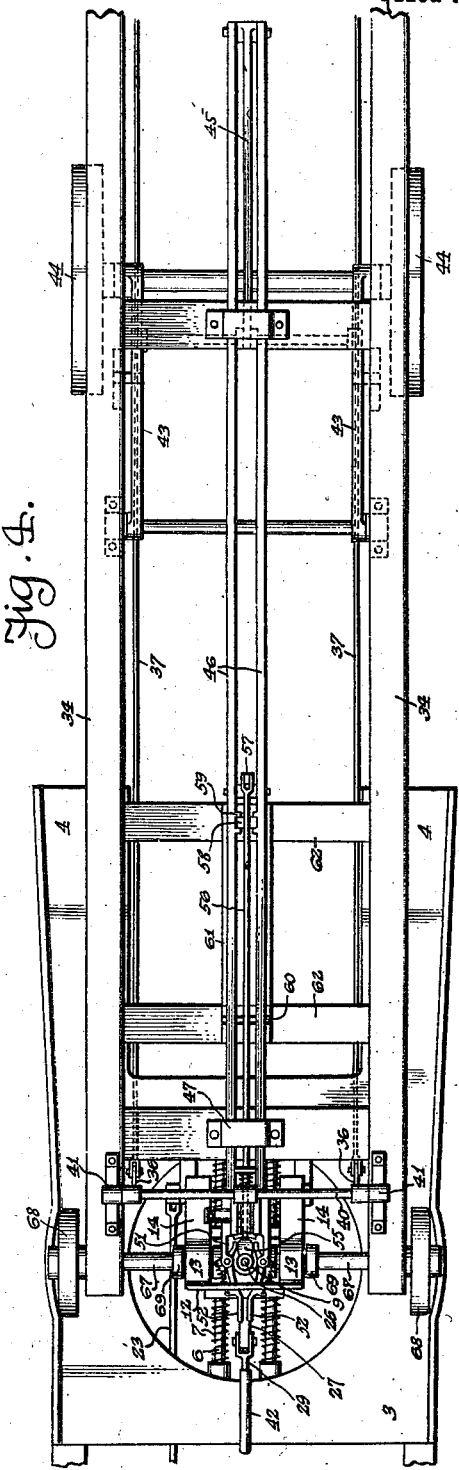
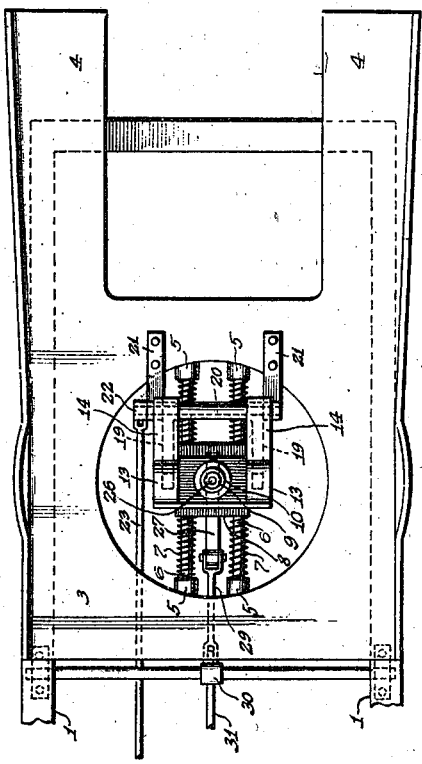
Inventor
Sidney B. Winn,
By
Attorneys Feb. 28, 1928.
S. B. WINN
1,660,944
TRACTOR TRAILER COMBINATION
Filed Aug. 22, 1924   5 Sheets-Sheet 3
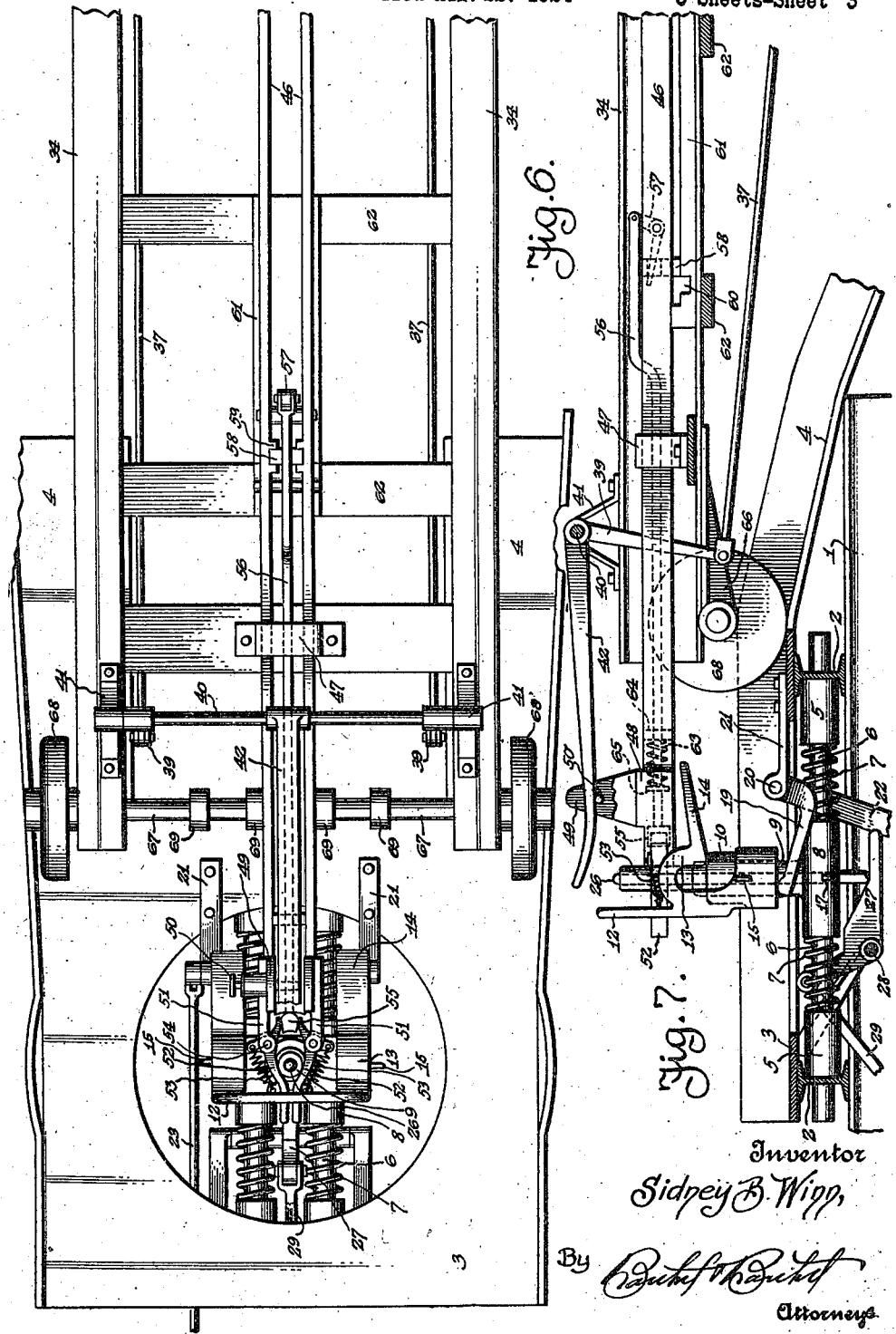
Inventor
Sidney B. Winn,
By
Attorneys

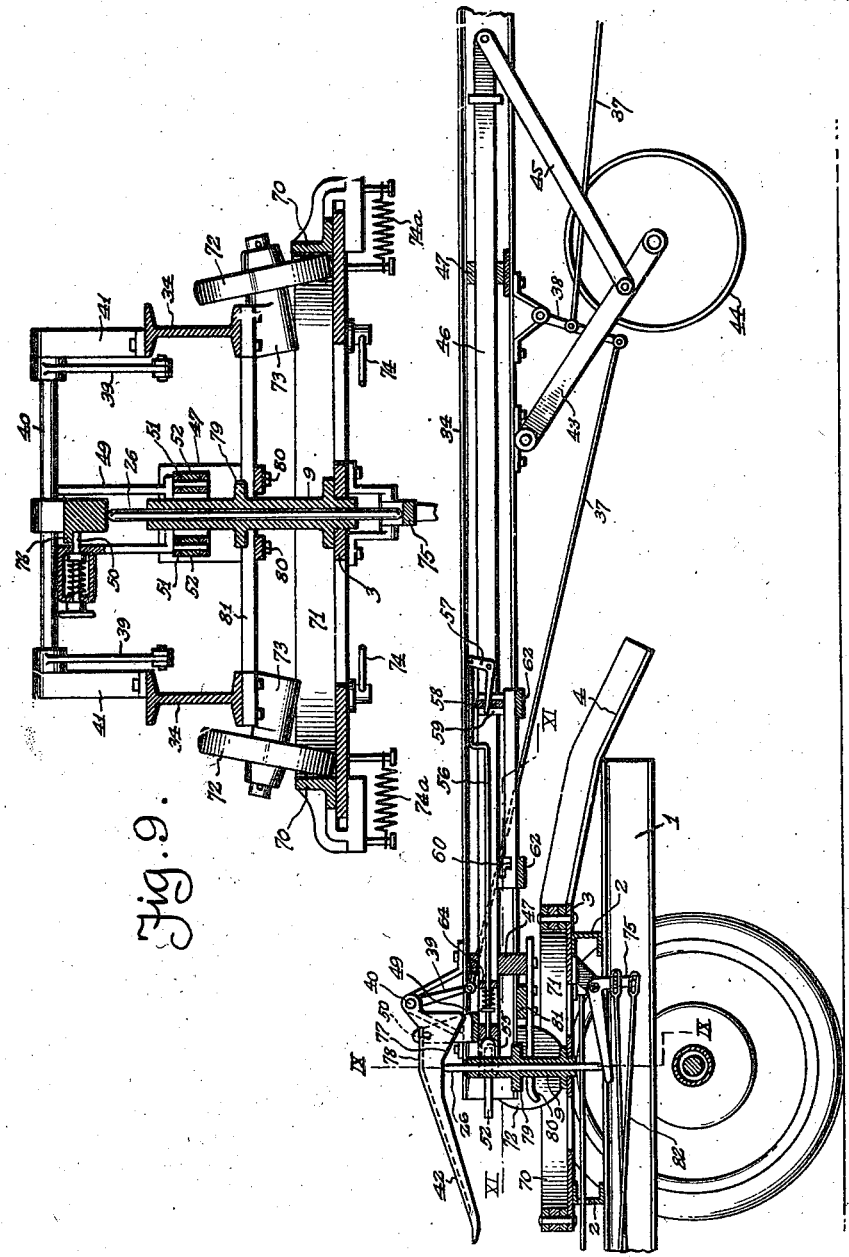

Feb. 28, 1928.

S. B. WINN 1,660,944

TRACTOR TRAILER COMBINATION

Filed Aug. 22, 1924     5 Sheets-Sheet 5

Inventor
Sidney B. Winn
By
Attorney

Patented Feb. 28, 1928.

1,660,944

UNITED STATES PATENT OFFICE.

SIDNEY B. WINN, OF LAPEER, MICHIGAN.

TRACTOR TRAILER COMBINATION.

Application filed August 22, 1924. Serial No. 733,522.

This invention relates to a tractor trailer combination and the invention includes a novel tractor equipment by which the forward end of a trailer may be easily and quickly coupled to the tractor and brakes of the trailer controlled from the tractor.

My invention also includes a novel trailer equipment wherein a wheeled prop or leg is adapted to support the forward end of the trailer, when the trailer is detached from the tractor, and provision is made for raising the leg as the tractor backs into engagement with the trailer.

There are certain novel features of construction to be specifically described and then claimed, and reference will now be had to the drawings, wherein Figure 1 is a longitudinal sectional view of the tractor trailer combination showing the tractor coupled to the trailer;

Fig. 2 is an enlarged cross sectional view taken on or about the line II—II of Fig. 1;

Fig. 3 is the enlarged detail sectional view of a bar releasing device.

Fig. 4 is a plan of the tractor trailer combination;

Fig. 5 is a plan of the tractor equipment;

Fig. 6 is a similar view showing the forward end of a trailer about to be uncoupled from the tractor;

Fig. 7 is a longitudinal sectional view of the same;

Fig. 8 is a longitudinal sectional view of the tractor trailer combination wherein a turntable or fifth wheel constitutes a part of a tractor trailer coupling;

Fig. 9 is a cross sectional view taken on or about the line IX—IX of Fig. 8.

Figure 10:
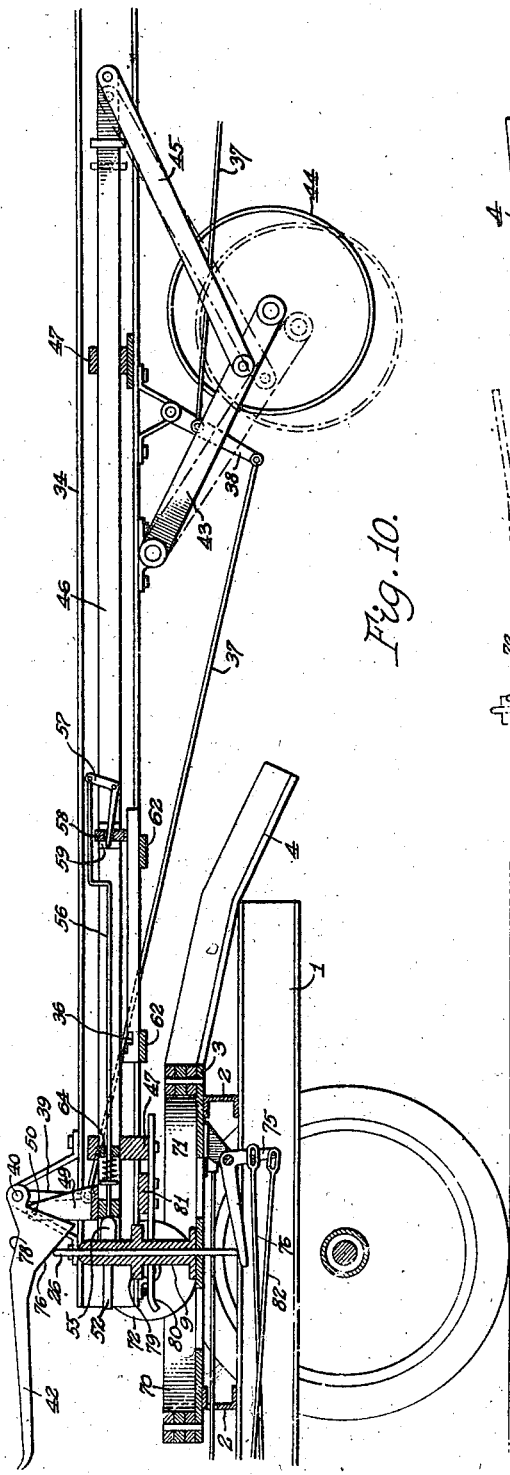
Figure 11:
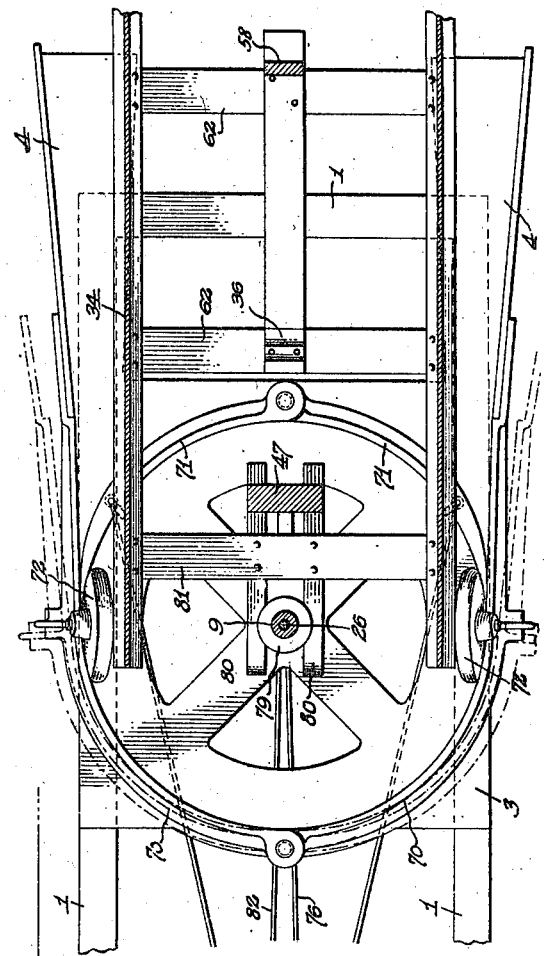

Fig. 10 is a view similar to Fig. 8, showing the trailer crowding the tractor and actuating the trailer brakes, and Fig. 11 is a horizontal sectional view taken on the line XI—XI of Fig. 8.

Considering the tractor equipment, the tractor chassis 1 is provided with transverse members 2 supporting a platform or turn table 3 which has rearwardly extending inclined rails 4 constituting a track leading to the horizontal platform or turntable 3.
The transverse members 2 support bearings 5 for a draft appliance including parallel rods 6, springs 7 and a cross head which will be yieldably held.

On the cross head 8 is a tubular post 9 and slidable on said tubular post and adapted to be raised and lowered thereon is a tractor coupling member 10 in the form of a sleeve having diametrically opposed arms 11 supporting a yoke or inverted U-shaped member 12 which is provided with rearwardly extending hooks 13 having inclined bills 14, said bills being disposed at an acute angle to the horizontal and extending rearwardly from the hooks. The outer ends of the arms 11 have apertured ears 15 connected by coiled retractile springs 16 to apertured ears 17 on the cross head 8 and the retractile force of the springs 16 is adapted to hold the tractor coupling member normally on the cross head, to permit of it being raised to the limit of a stop pin 18 carried by the tubular post. The raising of the tractor coupling member is essential in order that a trailer coupling member may be released. To raise the tractor coupling member crank 19 are employed and said cranks extend under the arms 11, as best shown in Figs. 2 and 7. The cranks are on a rock shaft 20 supported by brackets 21 from the platform or turntable 3, and said rock shaft has a crank 22 connected by a forwardly extending rod 23 to a pedal 24 located adjacent the driver's seat 25 of the tractor. By pressing on the pedal 24 the shaft 20 may be rocked to elevate the tractor coupling member, but it is to be noted that this tractor coupling member may be automatically raised, independent of the cranks 19, incident to the tractor backing under the forward end of the trailer as will hereinafter appear.

Other tractor equipment includes a trailer brake actuating pin 26 which is slidable in the tubular post 9 and has its lower end constantly resting on a cam bell crank 27 pivoted on a rod 28 carried by the tractor chassis. The bell crank 27 is connected by a link 29 to a crank 30 supported by the tractor chassis, and said crank is connected by a rod 31 to a brake lever 32 adjacent the driver's seat 25, said brake lever being of a conventional form having a locking device 33 which permits of the brake lever being set and secured.

Considering the trailer equipment, the trailer chassis is designated 34 and the rear end of the chassis is supported by the usual rear axle assembly including ground engaging wheels 35 and brakes 36 for said wheels. The brakes are adapted to be actuated by a set of rods 37 supported by hangers 38 from the chassis 34 and connected to a set of cranks 39 on a rock shaft 40, said rock shaft being journaled in brackets 41 mounted on the chassis 34 at the forward end thereof. Intermediate the ends of the rock shaft 40 is a brake arm 42 which extends forwardly and is adapted to be actuated by the brake pin 26 when the brake arm extends over the tubular post 9 incident to the tractor being coupled to the trailer. Assuming that there is such a service condition, the brake lever 32 can be pulled to elevate the pin 26 and the brake arm 42, causing the shaft 40 to be rocked and the brakes applied at the rear axle assembly of the trailer. When descending a grade or for any other cause should the trailer crowd the tractor and tend to push it ahead, the brake arm and brake pin 26 move as a unit, by virtue of the draft appliance on the tractor, but since the cam, bell crank 27 is supported independent of the draft appliance, the lower end of the pin 26 will ride up the cam surface of the bell crank 27 and cause the brake pin 26 to be elevated with the result that the brakes of the trailer are further applied. It is therefore evident that the draft appliance of the tractor cooperates with the brake mechanism between the tractor and trailer in preventing a loaded trailer from crowding a tractor. It is also apparent that the brakes of the trailer are controlled at will from the tractor and that except for the brake pin 26 operating through the tubular post 9, or in proximity thereto, the brake mechanism is independent of the tractor coupling member.

Other trailer equipment includes a pivoted prop leg or support 43 which is adapted to support the forward end of the trailer when said trailer is independent of the tractor. The pivoted support 43 may have ground engaging wheels 44 and said support is connected by an arm 45 to the rear end of a bar or member 46 slidable longitudinally of the trailer chassis 34 in transverse guides or members 47 provided therefor. The member 46 is preferably in the form of two parallel bars which have the forward ends thereof connected by a head 48 provided with upstanding guides 49 between which extends the brake arm 42. The brake arm normally rests on a bar releasing device in the form of a spring pressed pin 50 carried by one of the guides and best shown in Fig. 3. This pin is adapted to support the brake arm 42 with the trailer brake set when the support 43 is in a lowered position, because at which time the bar or member 46 protrudes beyond the forward end of the trailer chassis, as shown in Fig. 7, it having been shifted to such position by the forward movement of the tractor causing support 43 to descend aided by gravity.

With the pin 50 supporting the brake arm 42 substantially horizontal the trailer brakes will be set, but should it be desired to move the trailer independent of the tractor, the pin 50 can be withdrawn to release the brake arm 42 and permit of said arm being manually actuated to control the trailer brakes.

At the head 48 of the bar or member 46 are forwardly extending arms 51 supporting pivoted confronting jaws 52 adapted to embrace the upper end of the tractor post 9. The jaws 52 have the outer ends thereof connected by coiled retractile springs 53 to apertured lugs 54 of the arms 51, and said springs tend to open the jaws and hold the inner ends thereof in engagement with a tapered latch head 55 on a latch rod 56 guided between the bars 46 and extending rearwardly to a bell crank 57 pivotally mounted between the bars 46. The bell crank 57 extends into a latch 58 that may be raised and lowered in guides 59 carried by the confronting walls of the bars 46, and said latch is adapted to engage in a notch 60 of a keeper bar 61 connecting transverse members 62 of the trailer chassis. The forward end of the latch rod 56 is encircled by a coiled expansion spring 63 engaging an abutment 64 between the bars 46, also engaging a head 65 on the latch rod so as to push said latch rod forwardly and cause the latch 58 to enter the keeper notch 60. Otherwise the latch 58 slides on the keeper bar 61 when the bars 46 are pushed rearwardly to elevate the support 43.

As before stated the retractile force of the springs 53 holds the jaws 52 normally open and when so open the latch head 55 is in an advanced position between the jaws permitting the rear end of said jaws to engage the latch rod. As the tractor is backed to coupling position under the forward end of the trailer the upper end of the tubular post 9 passes in and between the jaws 52, impinges against the latch head 55 and pushes said latch head rearwardly. This accomplishes two things. First, the rear ends of the jaws 52 are separated closing the forward ends of the jaws about the post 9. Second, the latch rod 56 being shifted rearwardly raises the latch 58 out of the keeper notch 60, consequently backing of the tractor causes the post 9 to shift the bars 46 rearwardly and elevate the support 43.

Other trailer equipment includes bearings 66 at the forward end of the trailer for axle members 67 provided with wheels 68 and sets of collars 69. The wheels 68 are adapted to engage the inclined rails 4 leading to the platform or turntable 3, this taking place as the tractor backs under the trailer. The forward end of the trailer is elevated as the wheels 68 ascend the rails 4 and as the wheels 68 reach the platform 3 the axle member 67, constituting the trailer coupling member, are brought into engagement with the bills 14 of the hooks 13, causing the tractor coupling member to be elevated so that the hooks 13 may snap over and on to the axle members 67, thus coupling the tractor to the trailer, with the wheels 68 in position to swing about on the platform or turntable 3 when the tractor turns with its following trailer.

Reference will now be had to Figs. 8 and 9 of the drawings showing the tractor trailer brake mechanism applicable to that type of coupling disclosed in my pending application filed May 28, 1920, Serial No. 384,947, wherein the tractor platform 3 is provided with yieldable pivoted walls 70 and adjustable pivoted walls 71, said walls cooperating in forming a circular wall on the platform and it is in such circular wall that inclined wheels 72 of the trailer are adapted to travel. The wheels 72 are inclined inwardly and are supported from bearings 73 carried by the forward end of the trailer chassis. The pivoted walls 70 are yieldably held by a coiled retractile spring 74$^a$ and the adjustable walls 71 are adapted to be swung inwardly to permit of the wheels 72 leaving the platform as the tractor pulls away from the trailer. When backing the tractor under the trailer the wheels 72 riding on to the platform 3 may force the pivoted walls 71 inwardly until the wheels have passed within the the circular turntable formed by the walls 70 and 71 and the platform 3. To open the pivoted walls 71 so that the wheels 72 may pass off of the platform 3, the wheels 71 are connected by rods 74 to the pedal 24 of the tractor, and pressing on this pedal not only opens the walls 71, but sets the brakes of the trailer so that the tractor may easily pull away from the trailer. The setting of the trailer brakes by the pedal 24 is accomplished by connecting said pedal to a bell crank 75 by a rod 76, said bell crank being pivoted under the platform 3 to raise the brake pin 26 and operate the brake arm 42. The brake arm 42 differs slightly from that of the preferred form insomuch that said brake arm is formed with a cam surface 77 against which the upper end of the brake pin 26 may ride to apply the brakes, especially when the trailer crowds the tractor, as shown in Fig. 10. In this view the axis of the wheels 72 is in advance of the post 9 and said wheels have forced the walls 70 of the platform outwardly. The brake arm 42 has been raised and the trailer brakes applied sufficiently to retard the forward action of the trailer. The brake arm 42 is also formed with a flange 78 under which extends the pin 50.

Instead of the tubular post being carried by a draft rigging it is mounted centrally of the platform 3 with the brake pin 26 extending therethrough and said post has an annular collar 79 adapted to ride over and into a fork 80 extending forwardly from the transverse member 81 of the trailer chassis. This fork will prevent the forward end of the trailer from bouncing relative to the platform 3 without interferring with any turning action of the tractor relative to the trailer.

The brake lever 32 is connected to the bell crank 75 by a rod 82, which permits of the trailer brakes being operated at will from the tractor.

The trailer equipment, with the noted exceptions, is the same as in the preferred form of construction, and the operations of coupling, uncoupling, and controlling the brakes will be now described.

*Uncoupling.*—Assuming that the tractor is coupled to the trailer, as shown in Fig. 1, and the driver of the tractor desires to move the tractor from the trailer, the pedal 24 is depressed and the rod 23 and crank 22 cause the tractor coupling member 10 to be raised against the retractile force of the springs 16, placing the hook 13 of the tractor coupling member 10 at such an elevation that the coupling member 10 may be moved forward from the trailer axle members 67. As this forward movement takes place, the post 9 is carried forward against the closed jaws 52, as shown in Fig. 6. The jaws cannot open because of the latch head 55 between the rear ends of the jaws 52 and the latch head cannot move forward, under the influence of spring 63, because the latch 58 is on the keeper bar 61 and not in the notch 60. As a result of the post 9 engaging the closed jaws 52, the forwardly moving post pulls the jaws 52 along with it and the latch 58 slides forward on the bar 61. The support 43 lowers by gravity and has impetus imparted thereto by the bar or member 46, but in case the support is at all sluggish in its movement, the post 9 and the jaws 52 will pull the support to the ground. Eventually the latch 58 reaches the notch 60 and snaps therein under the influence of the expansive force of the spring 63, which expansive force is greater than that of the jaw springs 53, consequently the head 55 will be immediately shifted forward against the post 9, releasing the rear ends of the jaws 52 so that the forward ends of the jaws may open and the post 9 pass from therebetween. It is now apparent that the separated positions of the post 9 and head 55 are maintained during descent of the support 43, and upon the support approaching its lowermost position, the latch 58 is about to enter the notch 60, as shown in Fig. 7, thus permitting the head 55 to advance to the post 9. By this time the tractor coupling member 10 has been lowered; the jaws 52 opened, and the trailer brakes set by the pin 50 elevating the brake arm 42.

*Coupling.*—Ordinarily, the trailer is left standing with the brakes applied, to prevent accidental movement of the trailer and facilitate coupling of the tractor to the trailer by preventing the trailer from backing away from the tractor during a coupling operation. As the rails 4 raise the forward end of the trailer by the wheels 68 rolling up said rails, the post 9 enters the open jaws 52, engages the head 55 and pushes said head rearwardly, causing the latch 58 to be removed from the notch 60. This unlatching of the bar or member 46 permits the post 9 to push the bar or member 46 rearwardly to elevate the support 43. The head 55 separates the inner ends of the jaws 52 and retains the outer ends thereof closed.

As set forth in the beginning, depression of the pedal 24 by the tractor driver will elevate the tractor coupling member, but this is unnecessary on the part of the driver, for when the tractor is backed to place the rear end thereof under the forward end of the trailer for coupling, the inclined bills 14 of the tractor coupling member impinge against the axle members 67, causing the hooks 13 to be automatically raised and brought down on to the axle members 67, thus coupling the tractor and trailer for combined service.

The brake arm 42 engages the upper end of the pin 26 and the trailer brakes may be controlled from the tractor. The tractor post 9 remains against the head 55 because of the relative positions of the post 9, hooks 13 and axle members 67, thus preventing forward movement of the head 55 by the spring 63.

I desire to direct attention to the fact that the support of the trailer assumes an active supporting position and is locked in such position before the tractor actually moves from under the forward end of the trailer, and that coupling actually takes place simultaneously with the raising of the the support. It is impossible for the tractor to pull away from the trailer without the support being in a lowered and latch position, and this is a safety factor in connection with such a tractor trailer combination. It will also be noted that there is no danger of the support dropping to an active position as long as the two vehicles are coupled together.

While in the drawings there are illustrated the preferred embodiments of my invention, it is to be understood that the structural elements are susceptible to such variations and modifications as fall within the scope of the appended claims.

What I claim is:—

1. In a coupling for a tractor trailer combination, a trailer coupling member, a tractor post, and a tractor coupling member, slidable relative to said post and adapted to snap into engagement with said trailer coupling member, the trailer coupling member being pivotally supported on the post to permit service pivotal movement of tractor and trailer, the point of engagement between the tractor and trailer coupling members being spaced from the axis of pivotal movement of tractor and trailer.

2. A tractor trailer coupling as called for in claim 1, wherein said trailer coupling member is in the form of separated axle members supporting the forward end of the trailer relative to said tractor.

3. A tractor trailer coupling as called for in claim 1, wherein said tractor post is yieldably supported for movement longitudinally of said tractor.

4. In a coupling for a tractor trailer combination, trailer coupling members, tractors coupling members adapted by vertical reciprocation to automatically ride over said trailer coupling members, the trailer coupling member being pivotally supported on the post to permit service pivotal movement of tractor and trailer, the point of engagement between the tractor and trailer coupling members being spaced from the axis of pivotal movement of tractor and trailer, and means supporting said tractor coupling members to yield longitudinally of a tractor during service operations of the tractor trailer combination.

5. A tractor trailer coupling as called for in claim 4, and means adapted for raising said tractor coupling members to release said trailer coupling members.

6. In a tractor trailer combination wherein a tractor is adapted to back under the forward end of a trailer and coupled thereto:— a pivoted support adapted to support the forward end of the trailer when detached from the tractor, a bar articulated with the support and adapted to be actuated by the tractor to raise said support, a latch mechanism carried by said bar for securing said support in a lowered position, said latch mechanism being operable by the tractor in advance of said bar, and a wheeled coupling member on said trailer adapted to be supported and held by the tractor.

7. In a tractor trailer combination wherein a tractor is adapted to be backed under the forward end of the trailer and be coupled thereto:—a pivoted support adapted to support the forward end of the trailer when detached from the tractor, a bar connected to said pivoted support and protruding from the forward end of the trailer, a latch mechanism associated with said bar to hold the support in a lowered trailer supporting position, a post carried by the tractor and adapted to first engage the latch mechanism and then shift said bar to elevate said support, and coupling means carried by the tractor and trailer brought into coupled relation when said post causes said support to be raised.

8. A tractor trailer combination as called for in claim 7, wherein said coupling means includes hook members for the tractor and axle members for the trailer over which the hook members engage.

9. In a tractor trailer combination, a trailer provided with a brake mechanism including a brake arm, a tractor, coupling means for connecting said tractor to said trailer, a brake pin carried by the tractor at said coupling means adapted to actuate the brake arm of the trailer brake mechanism, and a cam bell crank carried by and operatable from the tractor for shifting said brake pin, said cam bell crank being disposed for said brake pin to ride by relative movement therebetween during relative movement of tractor and trailer thereon when the trailer crowds the tractor and cause further setting of the trailer brakes.

10. A tractor trailer combination as called for in claim 9, wherein said coupling means and said pin are yieldably held so that said pin may shift relative to said bell crank and the brake arm of the trailer brake mechanism.

11. A tractor trailer combination as in claim 9, and means engaging the brake arm of the trailer brake mechanism while the trailer is detached from the tractor for supporting said arm with the trailer brake set.

12. In a tractor trailer combination, a tractor, a trailer having a brake mechanism including a brake arm, a pivoted support for said trailer, a bar by which said support may be elevated, means on said bar normally engaging the brake arm of the trailer brake mechanism adapted to actuate said brake arm to set the trailer brakes when said support is lowered, and coupling means for connecting said trailer to said tractor.

13. A tractor trailer combination as called for in claim 12, and means associated with said coupling means adapted for actuating the brake arm of the trailer brake mechanism from said tractor.

14. In a tractor trailer combination, a tractor provided with a platform, a trailer, wheels carried by said trailer adapted to be retained on the tractor platform to establish a coupling between the tractor and trailer and a turntable connection, a pivoted support for the trailer, a brake mechanism for the trailer, a post carried by the platform of the tractor adapted to cause the trailer support to be raised when the tractor is backed under the trailer, and means operatable adjacent said post for controlling the brake mechanism of the trailer.

15. A tractor trailer combination as called for in claim 14, wherein the brake mechanism of the trailer includes a brake arm and the last mentioned means includes a pin shiftable longitudinally of said post for actuating the brake arm of the trailer brake mechanism.

16. Supporting means for the forward end of a semi-trailer comprising a pivoted support, a bar disposed longitudinally of the trailer and connected to said support and adapted for raising the support, and a latch carried by said bar adapted to secure said support in a lowered active position.

17. Supporting means for a semi-trailer, as called for in claim 16, wherein said latch is operable from the forward end of a semi-trailer in advance of said bar being actuated to raise said support.

18. In a tractor trailer combination wherein a tractor is adapted to be backed under the forward end of a trailer and coupled thereto, and a movable support is adapted to support the forward end of a trailer when detached from the tractor;—tractor controlled means for raising and lowering the said support and securing it in either position, said means including a member articulated with the support and adapted to be actuated by the tractor, and a latch mechanism carried by said member and adapted to be actuated by the tractor in advance of said member to release the member so that the tractor may actuate the member to raise said support when backing under the trailer.

19. A tractor trailer combination as called for in claim 18, and means on said member engageable by the tractor adapted to pull the member and cause the movable support to be lowered.

20. In a tractor trailer combination wherein a tractor is adapted to be backed under the forward end of a trailer and coupled thereto, and a movable support is adapted to support the forward end of the trailer when detached from the tractor;—a member and latch mechanism operatable by the tractor for adjusting the movable support and securing it in an adjusted position, said mechanism including a member articulated with the movable support, means on the forward end of said member engageable with the tractor part so that said member may be pulled forward by the tractor to adjust the movable support, and a latch device controlled by the tractor part for securing the member in an adjusted position.

21. In a tractor trailer combination wherein a tractor is adapted to be backed under the forward end of a trailer and coupled thereto, and a movable support is adapted to support the forward end of the trailer when detached from the tractor; tractor controlled means for lowering the movable support, said means including a member articulated with a movable support and adapted to be automatically coupled to the tractor and released therefrom so that as the tractor pulls away from the trailer the member is actuated to lower said support, and a latch mechanism associated with the member and adapted to secure the support in a lowered position.

22. A tractor trailer combination as called for in claim 21, wherein the latch mechanism serves as an instrumentality for releasing the member relative to the tractor after the support has been lowered.

23. In a tractor trailer combination wherein a tractor is adapted to be backed under the forward end of a trailer and coupled thereto, and wherein a supporting instrumentality is adapted to support the forward end of the trailer when detached from the tractor, and wherein said supporting instrumentality is adapted to assume an active position by gravity and an inactive position by virtue of said tractor backing under the forward end of said trailer:—means for establishing such tractor activities relative to said supporting instrumentality, said means including a reciprocable element connected to said supporting instrumentality, a tractor element engageable with said reciprocable element for placing said supporting instrumentality in an inactive position and retaining it in such position during a coupled tractor trailer relation, said reciprocable element including an open and closed structure at its forward end engageable by said tractor element for moving said reciprocable element to lend impetus to said supporting instrumentality when assuming an active position by gravity.

In testimony whereof I affix my signature.

SIDNEY B. WINN.